United States Patent [19]

Takane

[11] Patent Number: 4,463,419
[45] Date of Patent: Jul. 31, 1984

[54] MICROPROGRAM CONTROL SYSTEM

[75] Inventor: Hisao Takane, Tokyo, Japan

[73] Assignee: Nippon Electric Co., Ltd., Japan

[21] Appl. No.: 305,234

[22] Filed: Sep. 24, 1981

[30] Foreign Application Priority Data

Sep. 29, 1980 [JP] Japan ............................ 55-135458

[51] Int. Cl.³ ............................................ G06F 9/22
[52] U.S. Cl. ................................................ 364/200
[58] Field of Search ... 364/200 MS File, 900 MS File

[56] References Cited

U.S. PATENT DOCUMENTS 3,478,322 11/1969 Evans ................................. 364/200
4,118,773 10/1978 Raguin et al. ..................... 364/200

Primary Examiner—Raulfe B. Zache
Attorney, Agent, or Firm—Remy J. VanOphem

[57] ABSTRACT

A microprogram control system for use in a data processor. The system has a plurality of control memories. Under the control of microinstructions stored in one control memory, a necessary microinstruction is loaded from the main memory onto the other control memory.

1 Claim, 4 Drawing Figures

MICROPROGRAM CONTROL SYSTEM

BACKGROUND OF THE INVENTION

This invention relates to a microprogram control system for use in a data processor.

In ordinary data processors, control operations for the execution of software instructions are performed in accordance with command signals issuing from a control unit composed of logic circuits. As a result, the control unit is so complicated that it is difficult to obtain desired alterations in the processor operations. On the other hand, microprogram-controlled data processors which have been developed recently control the execution of software instructions by storing a plurality of microinstructions in a dedicated memory, sequentially reading these microinstructions out of the memory, and decoding them. The processors of this type have an advantage that the aforementioned alterations in processor operations can be easily attained by simply rewriting the microinstructions involved. Elevation of the operating speed in such processors requires high speed operations in the dedicated memory. Dedicated memories operable at high speeds are, however, highly expensive.

Incidentally, high speed operations are demanded for the execution of general software instructions. There are, nevertheless, software instructions such as ones directed to exceptional processings which may be processed at relatively low speeds without adversely affecting the performance of the processor operations. Heretofore, even the latter software instructions have been executed by using a plurality of microinstructions stored in a high-speed memory, thus preventing economic use of the high-speed memory. As a solution to this problem, there has been proposed a system in which a plurality of microinstructions for the execution of software instructions deserving low-speed processings are stored in an ordinary main memory, a necessary microinstruction is read out of the main memory each time a request for relevant processing occurs, and the read out microinstruction is overlaid or overwritten on a presently unnecessary microinstruction stored in a memory dedicated to controlling the execution of software instructions. For further details of the construction of this system, reference is made to the specification of U.S. Pat. No. 3,478,322. To be more specific, in the system disclosed in this patent specification, a microinstruction issued from a main memory (denoted by reference numeral 36 in FIG. 1A) is delivered to ECCS1 and ECCS2 via a computer I/O channel 6, a channel to channel adapter 40, and an ECCS I/O channel 5.

This system is not free from the disadvantage that design alterations are not easily accomplished, because the control operations involved are performed through the medium of a control unit formed by complicated logic circuits as mentioned above.

SUMMARY OF THE INVENTION

The present invention intends to eliminate the above disadvantages and has for its object to provide a simplified microprogram control system which has flexibility in overwriting.

According to the invention, there is provided a microprogram control system for use in a data processor which includes:

a first storage means for storing a plurality of microinstructions, each possessing an operation code field and an address field;

a main memory means adapted to undergo addressing according to the contents of the address field in a microinstruction received from the first storage means;

a second storage means for storing the data read out of the main memory means in response to the addressing; and a means for writing into the second storage means the data in response to the contents of the operation code field in the microinstruction.

This invention is characterized by the provision of a plurality of control memories whereby under the control of microinstruction stored in one control memory, a necessary microinstruction is loaded from the main memory onto the other control memory.

DESCRIPTION OF PREFERRED EMBODIMENT

Figure 1:
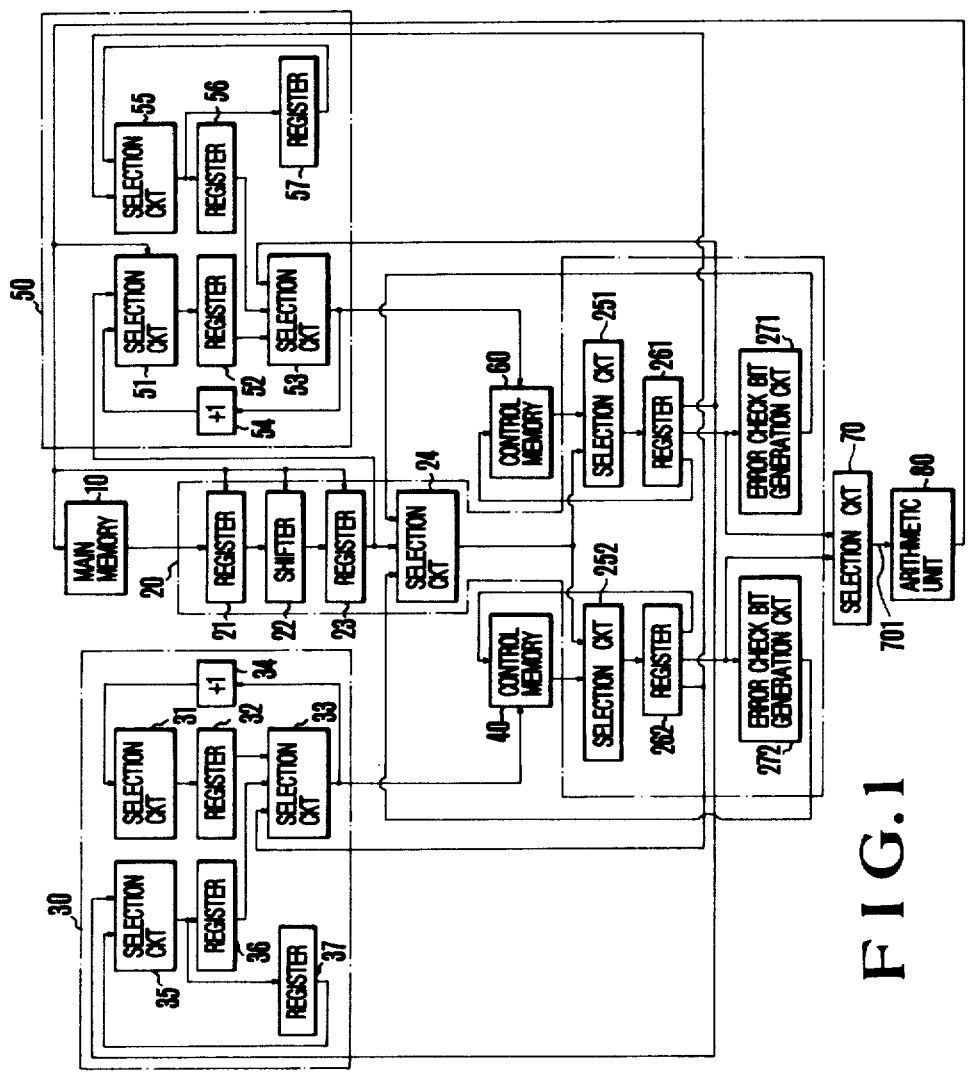
FIG. 1 is a block diagram illustrating a fragmentary construction of a data processor related to a microprogram control system embodying this invention.

Referring to FIG. 1, there is shown a microprogram control system embodying the invention as incorporated in a data processor. The system includes a main memory 10, a write unit 20, address generators 30 and 50, control memories 40 and 60, a selection circuit 70, and an arithmetic unit 80. The write unit 20 includes registers 21 and 23, a shifter 22, selection circuits 24, 251 and 252, registers 261 and 262, and error check bit generation circuits 271 and 272. The address generator 50 includes selection circuits 51, 53 and 55, registers 52, 56 and 57, and an adder 54.

Figure 2:
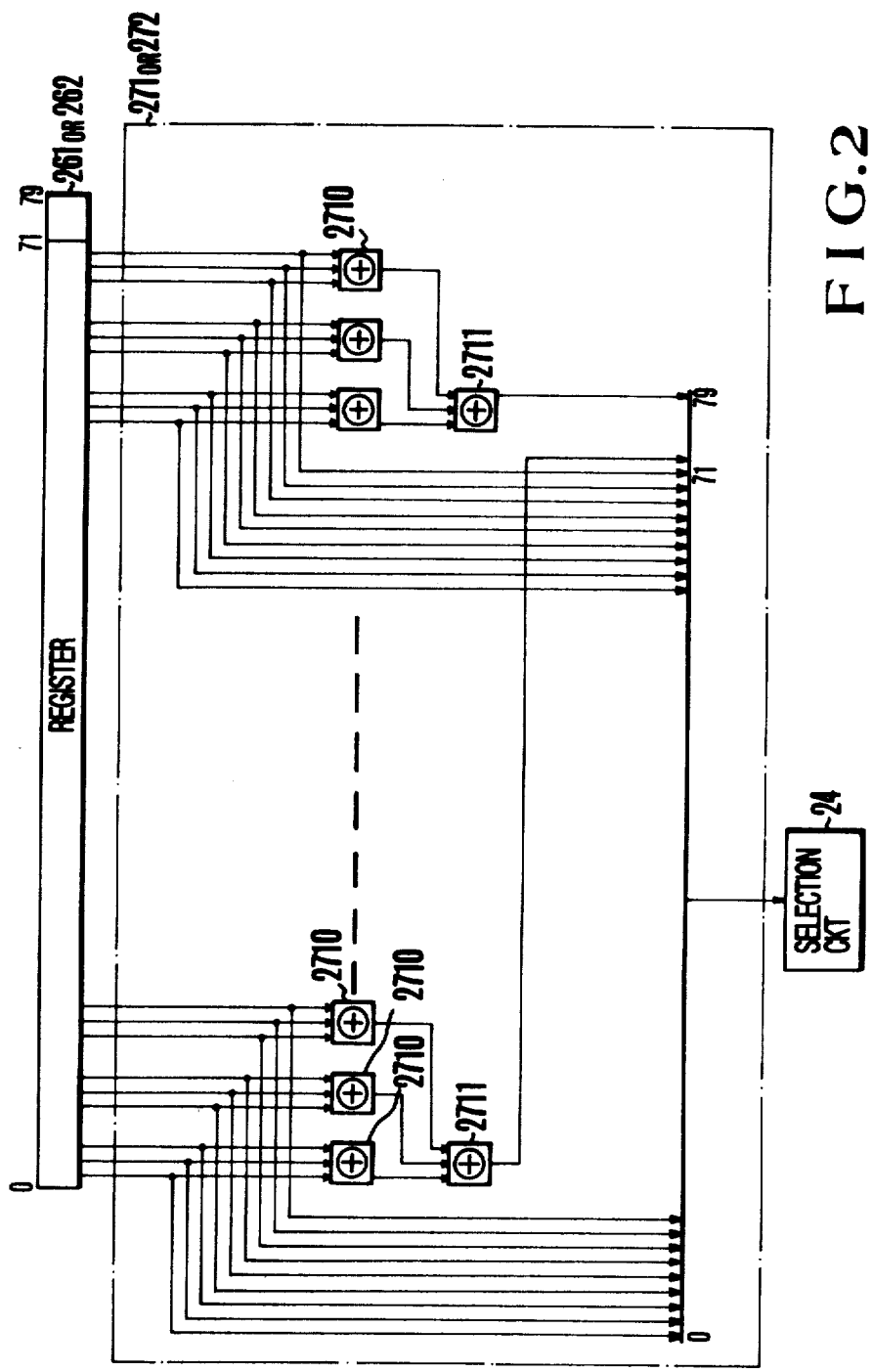
FIG. 2 is a logic circuit diagram showing the detailed construction of an error check bit generation circuit 271 or 272 in the embodiment of FIG. 1.
Figure 3:
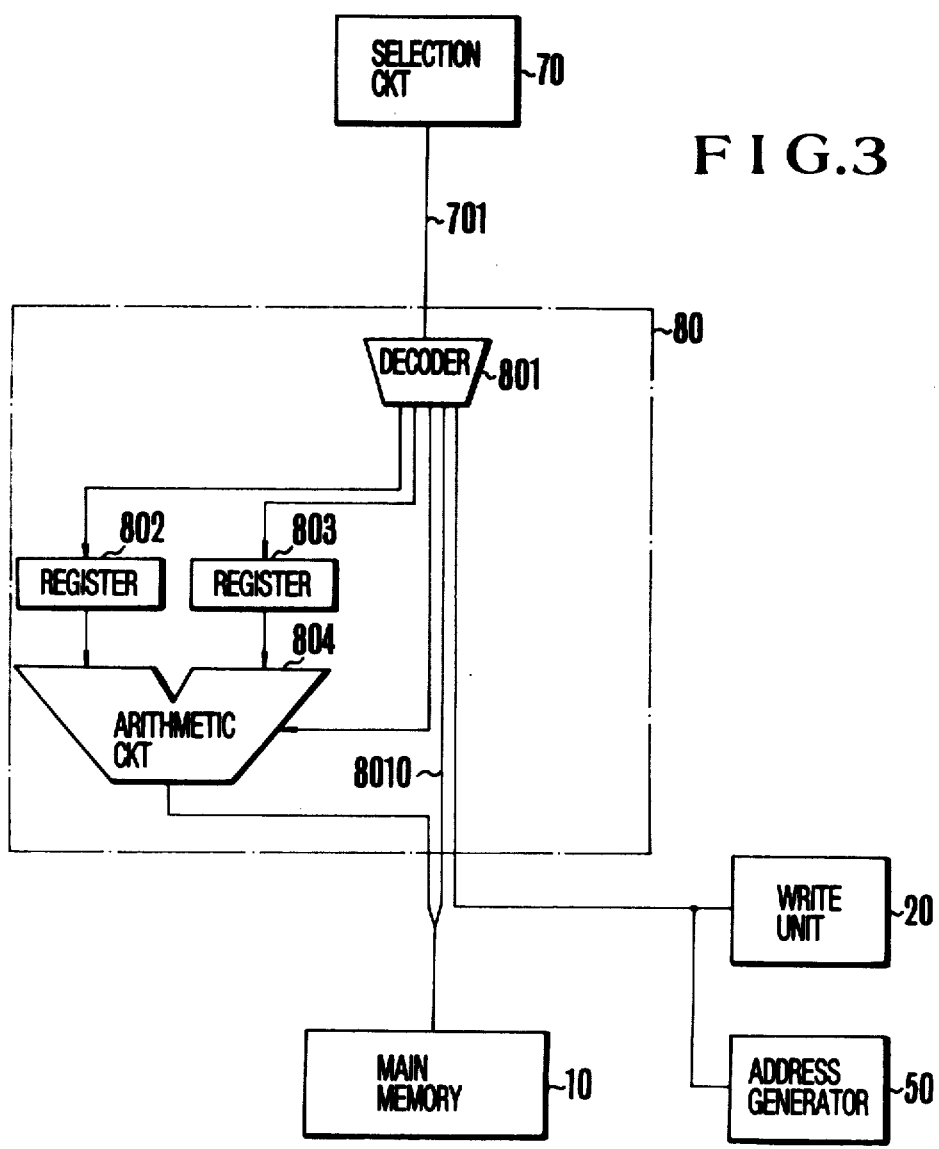
FIG. 3 is a block diagram showing the detailed construction of an arithmetic unit in the embodiment of FIG. 1.

Reference to FIG. 2 reveals that the error check bit generation circuit 271 or 272 includes a first group of at least two exclusive OR gates 2710 adapted to receive, in three-bit units, the information formed of a total of 72 bits, bit 0 through bit 71, from the register 261 or 262 and effect an exclusive logical sum of the information and a second group of at least two exclusive OR gates 2711 adapted to effect an exclusive logical sum of the signals from the adjacent three exclusive OR gates in the first group 2710. The circuit 271 or 272 can correct 1-bit error and detect 2-bit error. FIG. 3 reveals that the arithmetic unit 80 in FIG. 1 is composed of a decoder 801, a base register 802 for storing the base address indicating the head address of the associated memory or the main memory, an argument register 803 for storing the argument address indicating the deviation address ranging from that head address to a given address, and an arithmetic circuit 804 for calculation in respect of that base address and that argument address.

Figure 4:
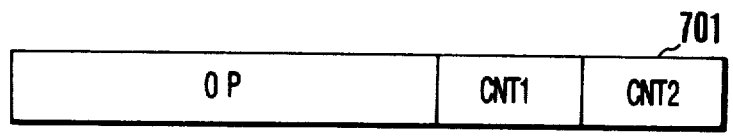
FIG. 4 is a diagram showing the output 701 of a selector 70 in the embodiment of FIG. 1.

FIG. 4 shows the format of the output data 701 from the selection circuit 70 shown in FIG. 1 and FIG. 3. This output format remains unchanged irrespective of whether the data is derived from the register 261 or from the register 262. The output data 701 is composed of an OP code field, a CNT1 field for controlling the memory access, and a CNT2 field for controlling the write unit 20, and address generators 30 and 50 shown in FIG. 1.

Now, the operation of the present invention will be described in detail below with reference to FIG. 1 through FIG. 3. When the execution of the microinstructions in the control memory 60 has proceeded to a point where a plurality of microinstructions to be subsequently executed are not present in the control memory 60 but are stored in the main memory 10, it becomes necessary that the plurality of microinstructions to be subsequently executed should be taken out of the main memory 10 and stored in the control memory 60. In this case, a microinstruction for reading out the microinstructions to be executed subsequently is first issued from the control memory 60, forwarded through the selection circuit 251, and stored in the register 261. Thereafter, a predetermined address for determining an overwrite routine for the control memory 60, namely, a branch terminal address in the control memory 40, is addressed by the register 261 via a selection circuit 35, a register 36, and a selection circuit 33. The information on the branch terminal address is added with +1 by an adder 34, and the result of this addition is delivered via a selection a circuit 31, a register 32, and a selection circuit 33 to the control memory 40 to address it. In response to this addressing and the branch terminal addressing, a microinstruction for the overwrite routine is issued from the control memory 40 and supplied via the selection circuit 252, the register 262, and the selection circuit 70 to the arithmetic unit 80. In the arithmetic unit, the microinstruction is decoded by the decoder 801 and executed by the arithmetic circuit 804 illustrated in FIG. 3. In the execution of the overwrite routine, the contents of the CNT1 field of the output 701 from the selection circuit 70 are first decoded by the decoder 801, an address of the main memory 10 is calculated by the arithmetic circuit 804, and the results are supplied, along with a read out request 8010, to the main memory 10. In response to the supply of these results, a write-in address for the control memory 60 is read out of the main memory 10. This write-in address serves to control the following operation in response to a control signal of the CNT2 field shown in FIG. 2 which is decoded by the decoder 801. To be specific, the write-in address is stored in the address register 52 via the register 21, the shifter 22, and the register 23 within the write unit 20 and then via the selection circuit 51 in the address generator 50. The write-in address which has thus been stored in the register 52 designates an address of the main memory 10 and causes the first data (72 bits) to be read and stored in the register 21, under the control of the CNT2 field in the output 701 which serves to designate the control memory 60 via the selection circuit 53. Then the data (72 bits) is divided into an upper field and a lower field in the shifter 22 and are stored, now in 36-bit units, in the prescribed fields of the register 23. Subsequently, the data of the register 23 is delivered via the selection circuit 24 and the selection circuit 251 and stored in the control register 261. And, the error check bit generation circuit 271 generates an error check bit relative to the data in the control register 261 and adds this error check bit to the data. The result of the addition is supplied to the selection circuit 24. The construction of the error check generation circuit 271 has been described in detail above with reference to FIG. 2. The data plus the check bit which have been given to the selection circuit 24 are forwarded via the selection circuit 251 and stored again in the control register 261. Then, depending on the address indicated in the address register 52 within the address generator 50, the contents of the register 261 are written in one word in the control memory 60. Simultaneously with this write-in operation, the contents of the address register 52 is added with +1 in the adder 54 and the resulting sum is stored in the address register 52. The series of the operations described above is repeated until all the necessary microinstructions are loaded in the control memory 60.

When the transfer of the necessary microinstructions from the main memory 10 to the control memory 60 is completed, a branch terminal address is read out of the address field of the last step microinstruction of the overwrite routine stored in the control memory 40, forwarded via the selection circuit 252, the register 262, and the selection circuit 55 of the address generator 50 to be stored in the register 56, with the result that the control memory 60 is designated through the medium of the selection circuit 53. Thereafter, a return address stored in the register 57 is read out, and the address in the main memory 10 of a microinstruction immediately preceding the execution of the overwrite routine is designated. In response to this designation, the microinstructions are read out and the plurality of microinstructions issued from the main memory and stored in the control memory 60 in consequence of the execution of the aforementioned overwrite routine are executed.

To sum up, summarize in the embodiments shown in FIG. 1, a loop tracing register 21, shifter 22, register 23, selection circuit 24, selection circuit 251, register 261, error check bit generation circuit 271, selection circuit 24, selection circuit 251, register 261 and control memory 60 participates in the write operation. This loop responds to the contents of the operation code field by way of the line between the register 261 and the selection circuit 70. On the other hand, a loop tracing control memory 40, selection circuit 252, register 262, selection circuit 70, arithmetic unit 80 and main memory 10 participates in the control operation including addressing the main memory, reading out the main memory and loading onto the control memory 60. The control memory 40 is addressed from the address generator 30 by way of the line between the selection circuit 33 and the control memory 40 whereas the control memory 60 is addressed from the address generator 50 by way of the line between the selection circuit 53 and the control memory 60.

As described above, the invention has an effect of enabling inexpensive, flexible firmware overwrite to be accomplished by loading, under the control of microinstructions stored in one of the plurality of control memories, the necessary instruction from the main memory onto the other control memory.

What is claimed is:

1. A microprogram control system for use in a data processor comprising:
   first control memory means for storing a plurality of microinstructions for an overwrite routine, each microinstruction possessing an operation code field and an address field;
   main memory means for outputting predetermined stored microinstructions in response to the contents of the address field in the microinstructions for said overwrite routine received from said first control memory means;

second control memory means for storing the microinstructions output from said main memory means, said second control memory means also storing at least one microinstruction for reading out the microinstructions for the overwrite routine from said first control memory means;

means for addressing said first control memory means to output said microinstructions for said overwrite routine in response to said second control memory means issuing said at least one microinstruction; and means for overwriting into said second control memory means said microinstructions output from said main memory means in response to the content of the operation code field in said microinstruction for said overwrite routine.

* * * * *

UNITED STATES PATENT AND TRADEMARK OFFICE
CERTIFICATE OF CORRECTION

PATENT NO. : 4,463,419
DATED : July 31, 1984
INVENTOR(S) : Hisao Takane

It is certified that error appears in the above-identified patent and that said Letters Patent is hereby corrected as shown below:

Column 2, line 28, after "Fig 1;" insert ---- and ----.

Column 2, line 44, delete "Reference to ".

Column 4, line 31, delete "sum up,". Same line, after "summarize insert ---- , ----.

Signed and Sealed this

Thirtieth Day of April 1985

[SEAL]

Attest:

DONALD J. QUIGG

*Attesting Officer*   Acting Commissioner of Patents and Trademarks